US010061971B2

(12) United States Patent
Li et al.

(10) Patent No.: US 10,061,971 B2
(45) Date of Patent: Aug. 28, 2018

(54) ENROLLMENT AND AUTHENTICATION ON A MOBILE DEVICE

(71) Applicant: QUALCOMM Incorporated, San Diego, CA (US)

(72) Inventors: Ming Li, Amherst, NY (US); Frederick W. Kiefer, Clarence, NY (US); John Keith Schneider, Williamsville, NY (US); Tao Sheng, Richmond Hill (CA); Alwyn Dos Remedios, Vaughan (CA)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 14/809,202

(22) Filed: Jul. 25, 2015

(65) Prior Publication Data

US 2016/0026840 A1 Jan. 28, 2016

Related U.S. Application Data

(60) Provisional application No. 62/029,265, filed on Jul. 25, 2014, provisional application No. 62/038,780, filed on Aug. 18, 2014.

(51) Int. Cl.
*G06K 9/00* (2006.01)
*G06K 9/52* (2006.01)

(52) U.S. Cl.
CPC ........... *G06K 9/001* (2013.01); *G06K 9/0002* (2013.01); *G06K 9/0008* (2013.01); *G06K 9/00013* (2013.01); *G06K 9/00026* (2013.01); *G06K 9/52* (2013.01)

(58) Field of Classification Search
CPC ............. G06K 9/00013; G06K 9/0002; G06K 9/00026; G06K 9/0008; G06K 9/001; G06K 9/52
See application file for complete search history.

(56) References Cited

U.S. PATENT DOCUMENTS

| | | | |
|---|---|---|---|
| 5,978,495 A | 11/1999 | Thomopoulos et al. | |
| 6,185,318 B1 * | 2/2001 | Jain | G06K 9/00087 382/115 |
| 6,546,122 B1 * | 4/2003 | Russo | G06K 9/00026 382/125 |

(Continued)

OTHER PUBLICATIONS

International Search Report and Written Opinion—PCT/US2015/042150—ISA/EPO—dated Nov. 9, 2015—(144606WO).

(Continued)

*Primary Examiner* — Gelek W Topgyal
(74) *Attorney, Agent, or Firm* — Weaver Austin Villeneuve & Sampson LLP

(57) ABSTRACT

Systems and methods for biometric authentication are disclosed. The invention may be used to authenticate an individual. At least two enrollment templates may be obtained at different times. Later, an inquiry template may be obtained and compared to each of the enrollment templates in separate and distinct comparison operations. The match scores arising from the comparison operations may be fused to provide a composite match score. The composite match score may be compared to an acceptance range. If the composite match score is within the acceptance range, the individual may be authenticated.

30 Claims, 13 Drawing Sheets

Enrollment Procedure

Lift, move and capture multiple images of the finger

Treat each image as unique and create a series of unique enrollment templates

(56) References Cited

U.S. PATENT DOCUMENTS

| | | | |
|---|---|---|---|
| 8,150,108 B2 | 4/2012 | Miller | |
| 2003/0076985 A1* | 4/2003 | Moghaddam | G06K 9/00087 |
| | | | 382/124 |
| 2003/0169910 A1* | 9/2003 | Reisman | G06K 9/00087 |
| | | | 382/124 |
| 2005/0058325 A1* | 3/2005 | Udupa | G06K 9/00087 |
| | | | 382/125 |
| 2005/0129291 A1 | 6/2005 | Boshra | |
| 2005/0265586 A1* | 12/2005 | Rowe | G06K 9/0012 |
| | | | 382/124 |
| 2005/0265587 A1 | 12/2005 | Schneider et al. | |
| 2006/0045350 A1* | 3/2006 | Itoh | G06K 9/00087 |
| | | | 382/209 |
| 2006/0104485 A1* | 5/2006 | Miller, Jr. | G06K 9/00979 |
| | | | 382/115 |
| 2007/0038867 A1* | 2/2007 | Verbauwhede | G06F 21/32 |
| | | | 713/186 |
| 2007/0248249 A1* | 10/2007 | Stoianov | G06K 9/00087 |
| | | | 382/124 |
| 2008/0175445 A1 | 7/2008 | Hu et al. | |
| 2008/0298646 A1* | 12/2008 | Wennergren | G06K 9/00087 |
| | | | 382/124 |
| 2009/0037978 A1* | 2/2009 | Luque | G06F 21/32 |
| | | | 726/2 |
| 2009/0232361 A1* | 9/2009 | Miller | G06K 9/00892 |
| | | | 382/115 |
| 2010/0021014 A1 | 1/2010 | Bebis | |
| 2010/0080425 A1* | 4/2010 | Bebis | G06K 9/00073 |
| | | | 382/125 |
| 2010/0138914 A1* | 6/2010 | Davis | G06F 21/32 |
| | | | 726/19 |
| 2010/0202671 A1* | 8/2010 | Chen | G06K 9/00093 |
| | | | 382/125 |
| 2011/0044514 A1* | 2/2011 | Rahmes | G06K 9/00067 |
| | | | 382/124 |
| 2013/0207779 A1 | 8/2013 | Uno et al. | |
| 2013/0259330 A1* | 10/2013 | Russo | G06K 9/00087 |
| | | | 382/124 |
| 2013/0272586 A1 | 10/2013 | Russo | |
| 2013/0336547 A1 | 12/2013 | Komogortsev | |
| 2014/0044322 A1* | 2/2014 | Kumar | G06K 9/00087 |
| | | | 382/124 |
| 2015/0055855 A1* | 2/2015 | Rodriguez | G06F 21/16 |
| | | | 382/159 |
| 2015/0078629 A1* | 3/2015 | Gottemukkula | G06K 9/0061 |
| | | | 382/117 |
| 2015/0110367 A1 | 4/2015 | Kumar et al. | |

OTHER PUBLICATIONS

Jain A.K., et al., "An Introduction to Biometric Recognition," IEEE Transactions on Circuits and Systems for Video Technology, Jan. 2004, vol. 14 (1), pp. 4-20.

Ross A., et al., "Information Fusion in Biometrics," Pattern Recognition Letters, Sep. 2003, vol. 24 (13), pp. 1-18.

Uhl A., et al., "Single-Sensor Multi-Instance Fingerprint and Eigenfinger Recognition Using (Weighted) Score Combination Methods," International Journal of Biometrics, 2009, vol. 1 (4), pp. 442-462.

Fathima A, "Fusion Framework for Multi modal Biometric Person Authentication System," XP055315059, Feb. 2014, 14 pages.

Jain A.K., et al., "Biometrics Personal Identification in Networked Society: Fingerprint Verification," XP055315058,1999, ISBN: 978-0-7923-8345-1, pp. 43-64.

Nandakumar K., et al., "Likelihood Ratio-Based Biometric Score Fusion," IEEE Transactions on Pattern Analysis and Machine Intelligence, Feb. 2008, vol. 30 (2), pp. 342-347.

International Preliminary Report on Patentability—PCT/US2015/042150, The International Bureau of WIPO—Geneva, Switzerland, dated Nov. 11, 2016 (144606WO).

Maltoni D., et al., "Handbook of Fingerprint Recognition" In: "Handbook of Fingerprint Recognition", Jan. 1, 2009, XP055431064, 30 Pages.

Stathaki T., "Image Fusion Algorithms and Applications", In: "Image Fusion", Jan. 1, 2008, 16 pages, XP055431071.

* cited by examiner

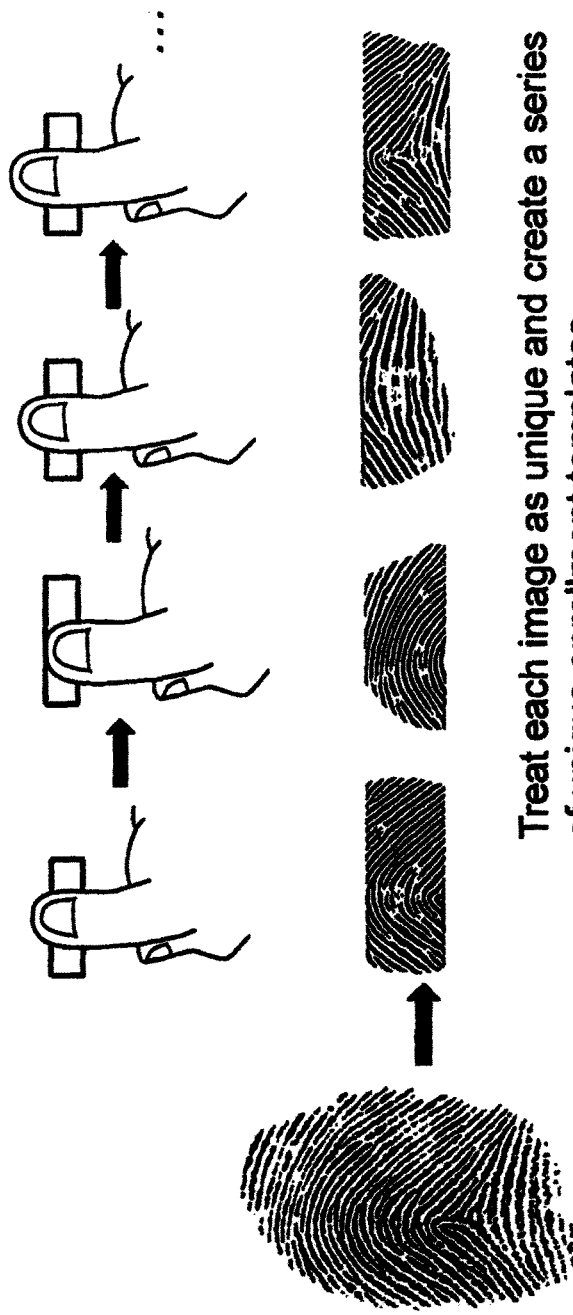

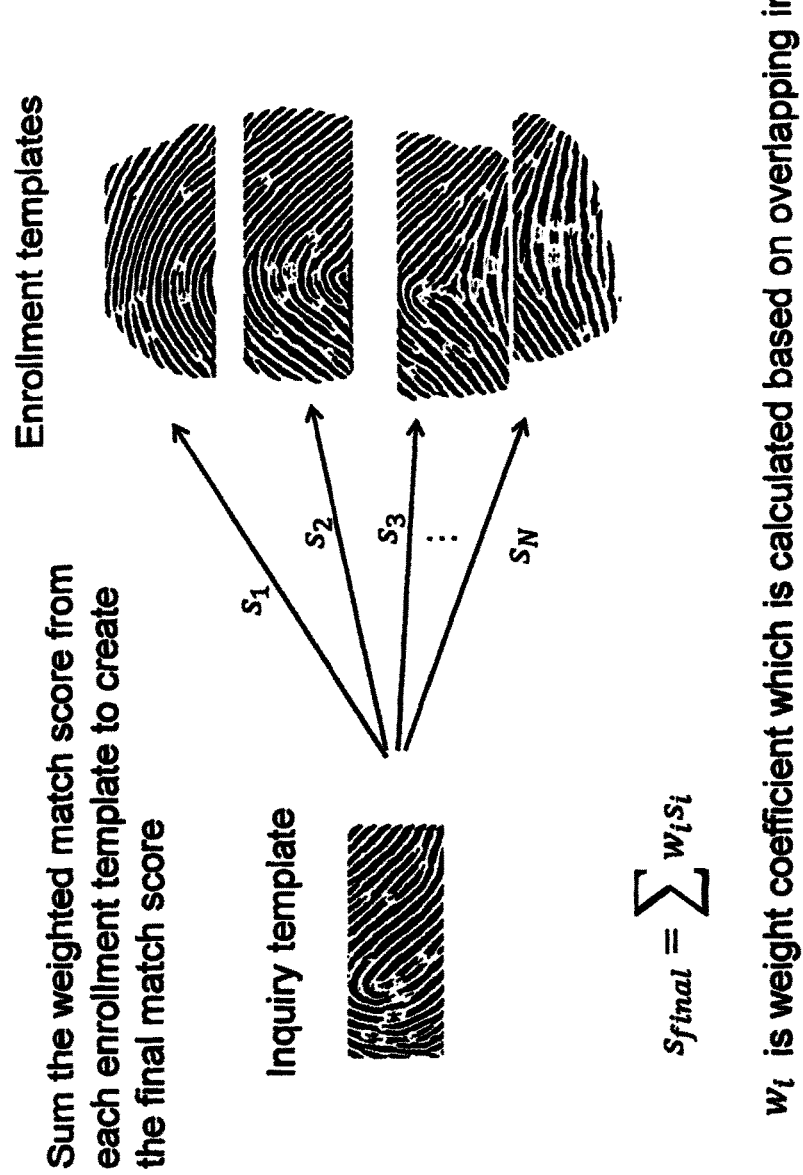

Rejected Images

ENROLLMENT AND AUTHENTICATION ON A MOBILE DEVICE

CROSS-REFERENCE TO RELATED APPLICATIONS

This application claims the benefit of priority to U.S. provisional patent application Ser. No. 62/029,265, filed Jul. 25, 2014 and to U.S. provisional patent application Ser. No. 62/038,780, filed Aug. 18, 2014.

FIELD OF THE INVENTION

The disclosure relates to devices, systems and methods of enrolling, authenticating and verifying an individual.

BACKGROUND OF THE INVENTION

Biometric sensors for mobile devices, including fingerprint sensors, are becoming increasingly smaller. A primary driving force toward smaller biometric sensors comes from the popularity of mobile electronic devices such as smart phones. Since mobile electronic devices are limited in size, components such as fingerprint sensors must also be small. Furthermore, as more components are incorporated into a mobile electronic device and the overall size of that mobile device does not increase, the components must be reduced in size in order to fit within size constraints of the mobile device.

For purposes of describing the invention, this document will focus on fingerprint sensors, but the invention is not limited to this small subset of biometric sensors. Traditional fingerprint sensors that can capture an entire finger typically have an active image area of about 1"×1". However, capture sizes of fingerprint sensors for smart phones are generally much smaller, with active image areas on the order of about 15 mm×6 mm, 9 mm×4 mm, 8 mm×3 mm, 5 mm×5 mm, and smaller. As such, the fingerprint sensor on a smart phone or mobile device may often image only a small portion of a fingerprint (e.g. a friction-ridge surface of a finger).

Since the active area of a fingerprint sensor is often much smaller than a finger, the finger can be placed over the sensor in a variety of orientations and positions. If the fingerprint template information (also referred to as a template) generated from an acquired fingerprint image obtained during an enrollment process does not closely match the template obtained from the fingerprint at the time of inquiry, the fingerprint matching component of the mobile electronic device may fail to properly identify or verify a user. When the fingerprint matching component fails to properly verify the user, the component may falsely reject the user as being unauthorized for the desired task (which may include unlocking or otherwise using the mobile device).

It should be noted that the actual fingerprint image may not be matched to another fingerprint image. Rather, a template having information about a fingerprint may be created by a feature extraction process, and the templates may be compared to one another in order to determine whether a match exists. Matching processes may utilize, for example, minutiae-matching or pattern-matching (a.k.a. keypoint-matching) procedures. Fingerprint templates may contain information, for example, about minutiae points or keypoints within a fingerprint image.

Attempts have been made to reduce the false rejection rate. One of the more popular solutions involves obtaining multiple templates corresponding to images of the finger at the time of enrollment. During the enrollment process, the user is asked to place a finger on the fingerprint sensor repeatedly, for example, 10 to 15 times. After each placement, the user is asked to move his/her finger "slightly" before a subsequent image is taken. This "stitched enrollment" process can be frustrating for the user.

The goal of this stitching technique is to create a full size enrollment image by stitching together multiple smaller images. However, in order for this stitching technique to yield the desired benefits, the user must place his/her finger on the fingerprint sensor in such a manner as to have new ridge structure imaged by the sensor that was not previously imaged during the enrollment process, but still have enough overlap with the previous image so as to allow the fingerprint matching component to correlate the two images (i.e. stitch the images together). The desired amount of overlap does not always occur, thereby undermining the ability of the system to properly identify those who have enrolled. Improvements to the speed and accuracy of enrolling and validating a user of a mobile device are therefore desired, particularly for sensors with a smaller active area.

SUMMARY OF THE INVENTION

Embodiments for a method of authenticating an individual are disclosed. If the individual is authenticated, then the individual may be allowed to engage in an activity such as accessing a database, using a computer, entering a building, or accessing a software application running on a mobile device.

In one such method, an enrollment biometric object (i.e. a biometric object provided for the purpose of enrolling a user into an authentication system) such as a friction-ridge surface of a finger, may be scanned at a first time to produce a first enrollment template. The enrollment biometric object may be moved, and the enrollment biometric object may be scanned a second time to produce a second enrollment template. At a later time, an inquiry biometric (i.e. a biometric object, which may be the same type or the same object as the enrollment biometric object that is provided for the purpose of being authenticated by an authentication system) may be scanned in order to provide an inquiry template at a third time. Scanning may be carried out by an ultrasonic sensor. In some implementations, an ultrasonic or capacitive area-array sensor may be used for scanning purposes.

A first match score may be produced by comparing the inquiry template with only the first enrollment template, and a second match score may be produced by comparing the inquiry template with only the second enrollment template. The match scores may be mathematically fused in order to produce a composite match score, and the composite match score may be compared to an acceptance range. If the composite match score is within the acceptance range, then the individual may be authenticated.

Mathematically fusing the match scores may include multiplying each of the match scores by a weighting factor to provide a weighted match score, and adding the weighted match scores to produce a composite match score. The weighting factor may be based on a quality value associated with the enrollment template. In some implementations, the quality value associated with the enrollment template may be based on image contrast determined during an enrollment process. In some implementations, the quality value associated with the enrollment template may be based on a signal-to-noise ratio determined during an enrollment process, or the quality of the enrollment template may be assessed based on how much the inquiry template overlaps with the enrollment template.

One embodiment is a system including one or more biometric sensors, a database in communication with at least some of the sensors, and one or more programmed computers or processors that are in communication with the database and possibly one or more of the sensors. The computer or processor may be programmed to carry out the method described above.

More generally speaking, one embodiment of a system has
(a) a means for scanning a portion of a friction-ridge surface of an enrollment finger at a first time to produce a first enrollment template, and at a second time to produce a second enrollment template;
(b) a means for scanning a portion of a friction-ridge surface of an inquiry finger at a third time to produce an inquiry template;
(c) a means for producing a first match score by comparing the inquiry template with the first enrollment template and for producing a second match score by comparing the inquiry template with the second enrollment template;
(d) a means for mathematically fusing the match scores to produce a composite match score;
(e) a means for comparing (which may be a programmed computer) the composite match score to an acceptance range; and
(f) means for authenticating (which may be a programmed computer) the individual if the composite match score is within the acceptance range.

The means for scanning a portion of a friction-ridge surface of the enrollment finger or the means for scanning a portion of a friction-ridge surface of the inquiry finger may be an area-array sensor. The means for scanning a portion of a friction-ridge surface of the enrollment finger or the means for scanning a portion of a friction-ridge surface of the inquiry finger may be an ultrasonic sensor.

The means for mathematically fusing the match scores may multiply at least one of the match scores by a weighting factor to provide a weighted match score. The means for mathematically fusing the match scores may determine the weighting factor based on a quality value associated with the enrollment template.

One embodiment, which may be used to program the computer mentioned above, may be a non-transitory computer-readable storage medium having stored thereon instructions for carrying out a method described herein. The instructions may cause a computer to:
(a) scan a portion of a friction-ridge surface of an enrollment finger at a first time to produce a first enrollment template;
(b) scan a portion of a friction-ridge surface of the enrollment finger at a second time to produce a second enrollment template;
(c) scan a portion of a friction-ridge surface of an inquiry finger at a third time to produce an inquiry template;
(d) produce a first match score by comparing the inquiry template with the first enrollment template;
(e) produce a second match score by comparing the inquiry template with the second enrollment template;
(f) mathematically fuse the match scores to produce a composite match score;
(g) compare the composite match score to an acceptance range; and
(h) authenticate the individual if the composite match score is within the acceptance range.

The instructions on the non-transitory computer-readable storage medium may cause the computer to instruct an area-array sensor to carry out scanning of a portion of a friction-ridge surface of the enrollment finger or the inquiry finger. The instructions on the non-transitory computer-readable storage medium may cause the computer to instruct an ultrasonic sensor to scan a portion of a friction-ridge surface of the enrollment finger or the inquiry finger.

The instructions on the non-transitory computer-readable storage medium may cause the computer to mathematically fuse the match scores by multiplying at least one of the match scores by a weighting factor to provide a weighted match score.

The instructions on the non-transitory computer-readable storage medium may cause the computer to determine the weighting factor based on a quality value associated with the enrollment template.

BRIEF DESCRIPTION OF THE DRAWINGS

For a fuller understanding of the nature and objects of the invention, reference should be made to the accompanying drawings and the subsequent description. The disclosure will now be described by way of non-limiting examples, with reference to the attached drawings and diagrams.

FIGS. 1B and 1C are graphical representations of a method described in FIG. 1A.

DETAILED DESCRIPTION OF THE DISCLOSURE

Figure 1A:
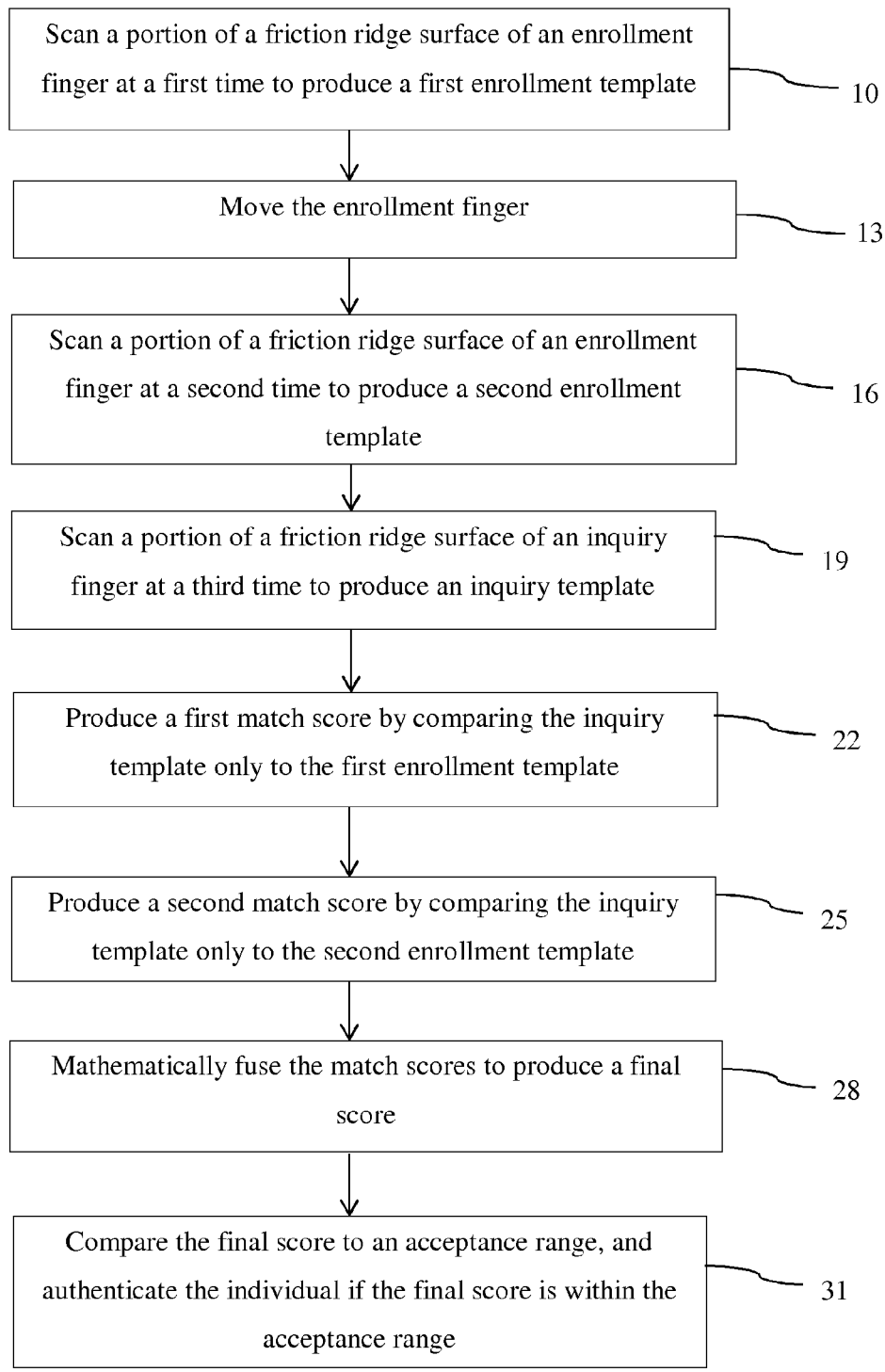
FIG. 1A illustrates a flow diagram depicting a method of authenticating an individual.

One embodiment includes a method of authenticating an individual (e.g. a human being) by obtaining and storing at least two enrollment templates, and at a later time comparing each of those enrollment templates to an inquiry template in separate comparison operations. Each enrollment template describes a biometric object (e.g. a friction-ridge surface of a finger) of the individual, who may desire to be authenticated at a later date. In contrast to the enrollment template, the inquiry template describes a biometric object (e.g. a friction-ridge surface of a finger) of an individual that desires to be authenticated, who may or may not be the same individual that provided the biometric object for the enrollment templates. The enrollment templates and the inquiry template may each be a computer-readable file that has information about the biometric objects from which these files were generated. These files may (but need not) include enough information to generate an image of the biometric object via a display monitor.

In some implementations, the information contained in the enrollment templates is not combined with information in other enrollment templates. For example, the enrollment templates may not include template information from enrollment images that have been stitched together to create a larger, more "representative" template of the fingerprint than would otherwise be possible based solely on the sensor size. Rather, each enrollment template may be treated and used independently from other enrollment templates. When the individual desires to be authenticated, an inquiry template may be obtained from the individual, and the inquiry template may be compared separately to each of the enrollment templates. For example, features found in the inquiry template may be compared to features found in an enrollment template, and the degree of similarity between these features may be determined in order to assess whether the inquiry template and the enrollment template can be declared to match one another. The degree of similarity may be quantified and represented as a match score. As such, the match score may indicate how similar the enrollment template is to the inquiry template. In some implementations, two or more images acquired during an enrollment process may be stitched together to form any one of the enrollment templates. In a hybrid approach, one or more enrollment templates based on stitched images and one or more templates based on un-stitched (e.g. single) images may be used in the matching/verification process.

By comparing the inquiry template to each of the enrollment templates, a match score may be generated from information produced by each of the comparisons. Consequently, a match score may be generated for each of the enrollment templates. The match scores may be mathematically fused to produce a composite match score. The composite match score may be associated with the inquiry template that was used to produce the match scores.

An acceptance range may be identified and compared with the composite match score in order to assess whether an individual should be authenticated. For example, the composite match score may be compared to the acceptance range, and if the composite match score is within the acceptance range, the individual may be authenticated. However, if the composite match score is not within the acceptance range, the individual may not be authenticated.

Once authenticated, the individual may be permitted to engage in an activity that is permitted for those that have been authenticated. For example, an authenticated individual may be permitted to access a computer database, use a computer, use a mobile electronic device, access or otherwise use a software application running on a mobile device, or enter a building.

Although many types of biometric objects may be used in conjunction with this invention, one particularly useful biometric object is the friction-ridge surface of a finger. Each of the enrollment templates and the inquiry template may be obtained by scanning a portion of the friction-ridge surface of a finger. One or more ultrasonic fingerprint sensors, which may be area-array sensors, may be used for this purpose. An example of an ultrasonic area-array sensor that is suitable for this purpose is described in U.S. Pat. No. 7,739,912 entitled "Ultrasonic Fingerprint Scanning Utilizing a Plane Wave".

Having provided a general overview of a method for authenticating a user, additional details are now provided. The figures are used along with the following text in order to better communicate features that are in keeping with the invention.

The enrollment templates may be obtained at different times from an enrollment biometric object, such as a finger. That is to say that the enrollment templates may be obtained during different scanning operations, such as during successive scans of an enrollment session. Movement of the enrollment biometric object between scanning operations is permitted, and may be beneficial. For instance, the individual providing the enrollment biometric object may be instructed to move the enrollment biometric object after a first scanning operation is complete, and before a second scanning operation commences. In this manner, the enrollment templates will likely not be highly similar to one another. However, it should be noted that two or more enrollment templates may be highly similar, or even identical.

With reference to FIGS. 1A, 1B and 1C, a first enrollment template may be obtained by scanning 10 a portion of a friction-ridge surface of an enrollment finger at a first time during which a first scanning operation occurs. The enrollment finger may be moved 13 relative to the sensor, and a second enrollment template may be obtained by scanning 16 a portion of the friction-ridge surface of the enrollment finger at a second time during a second scanning operation. The first and second enrollment templates may image different parts of the friction-ridge surface. Thus, in some instances, the first and second enrollment templates may or may not image overlapping parts of the friction-ridge surface. Although only two enrollment templates are identified in the description above, more enrollment templates may be obtained and used. That is to say, the invention is not limited to collecting and comparing merely two enrollment templates—instead, at least two enrollment templates will be collected, but more may be collected and used, if desired, for a single individual. For example, in some implementations, three, four, five, six, seven, eight or more enrollment templates may be generated of a finger during an enrollment session. In some implementations, an angle or direction of the finger with respect to the active area of the sensor may be cued to the user during enrollment to acquire various enrollment templates at a variety of angles. The cued angle or direction of the finger may be stored with the template information for each template, for example, as cued orientation-angle metadata associated with the template.

After the set of enrollment templates are obtained and the enrollment process is complete, the individual may desire to be authenticated. In order to be authenticated, the individual may present a biometric object at a third time (herein, this biometric object is called the "inquiry biometric object") during which a third scanning operation occurs 19 in order to produce the inquiry template corresponding to the inquiry biometric object. While enrollment templates may be generated 10, 16 during an enrollment phase, the third scanning operation 19 may occur during an authentication/verification phase. The inquiry biometric object may or may not be the same biometric object that was presented during enrollment. The inquiry template may be compared 22, 25 to each of the enrollment templates during separate comparison operations, which may be carried out at the same time or at different times. Each comparison operation 22, 25 may produce a match score, which is indicative of the degree to which the inquiry template matches the enrollment template. A comparison may be made between all of the enrollment templates and the inquiry template, or comparisons may be made between a proper subset (i.e. less than all of the enrollment templates for the individual) of the enrollment templates and the inquiry template.

The match scores, each of which corresponds to a comparison of the inquiry template and at least one of the enrollment templates, may be mathematically fused 28 in order to produce a composite match score. Fusing the match scores may be accomplished merely by adding the match scores together to determine a sum. However, it is believed that a better manner of fusing the match scores involves multiplying each match score by a weight in order to produce a weighted match score, and then adding the weighted match scores in order to produce the composite match score. In this manner, the enrollment templates that have higher weights will be more influential with regard to the composite match score, and those enrollment templates that have lower weights will be less influential with regard to the composite match score. In some implementations, the weighting factor may be based on a degree of overlap between the inquiry template and one or more of the enrollment templates. For example, a larger weighting factor may be determined between an inquiry template and an enrollment template when the template information indicates a higher level of overlap between the template information associated with each of the templates (e.g. with nearly identical enrollment and inquiry images), whereas a lower weighting factor may be determined when little or no overlap occurs between the template information. When the weighting factor between an inquiry template and any of the enrollment templates is higher, the accuracy of the composite match score may also be higher and the likelihood of determining a correct match increases.

A weight for each enrollment template may be determined based on criteria that is designed to reflect the ability of an enrollment template to accurately authenticate an individual. For example, if some of the enrollment templates are believed to be higher in quality than other enrollment templates, then the higher-quality enrollment templates may be associated with higher weights and the lower-quality enrollment templates may be associated with lower weights. One or more quality values may be associated with each enrollment template. In some implementations, the quality of each enrollment template may be assigned a quality value that is based on image contrast determined during the enrollment process. In some implementations, the quality of each enrollment template may be assigned a quality value that is based on a signal-to-noise ratio determined during the enrollment process. For example, an enrollment template having a higher image contrast or higher signal-to-noise ratio may be given a weight that is higher than other enrollment images that have a lower image contrast or a lower signal-to-noise ratio. Or, the quality of the enrollment template may be assessed based on how much the inquiry template overlaps with the enrollment template. In some implementations, the quality value based on image contrast may be determined from an acquired enrollment image by subtracting the signal levels of a plurality of ridge regions from the signal levels of a plurality of valley regions prior to storing the template. In some implementations, the quality value based on a signal-to-noise ratio may be determined by generating a ratio between the largest signals in a scanned region of the finger and an average background signal (e.g. without ultrasonic energy applied during image acquisition) of an acquired enrollment image. In some implementations, the quality value based on the degree of overlap may be determined by calculating the fractional area in one template that is contained in another template. In some implementations, one or more quality values may be stored with the template information for each template, for example, as quality metadata associated with the template. In some implementations, a low quality value or quality score may cause an enrollment template to be discarded and replaced by an enrollment template with a higher quality score. For example, a user may be instructed to re-position a finger on the sensor during an enrollment phase to generate or produce a substitute enrollment template.

Once mathematical fusing and production of the composite match score 28 corresponding to an inquiry template are completed, the composite match score may be compared 31 to an acceptance range. The acceptance range may be selected so as to authenticate those individuals who should be authenticated, but deny authentication to those individuals who should not be authenticated. That is to say that with some experience, it will become known that composite match scores in a particular range of values generally correspond to individuals that should be authenticated, and that composite match scores outside that range generally correspond to individuals that should not be authenticated. For example, the acceptance range may be set so as to authenticate individuals having composite match scores at or above a certain value, while denying authentication to those individuals having composite match scores below that value. In some implementations, an acceptance threshold value may define the authentication range, such that composite match scores above the acceptance threshold value allows a user to be authenticated while composite match scores below the acceptance threshold value prevents the user from being authenticated. In some implementations, the acceptance range may be a user-dependent acceptance range. For example, the acceptance threshold value may be adjusted or otherwise adapted to accommodate users with difficult-to-image fingers or users with minimal fingerprint ridges. In some implementations, a user-dependent acceptance threshold value may be stored as acceptance threshold value metadata along with other template information in each template.

In some embodiments, the enrollment process may be completed without stitching enrollment templates or acquired image data together. Such stitching operations may be difficult, costly and frustrating for the individual during the enrollment process. By offering the ability to complete enrollment without stitching, an individual that desires to be enrolled may be enrolled more quickly since there is no need to obtain images that overlap. Furthermore, it is possible that the enrollment process may be completed by obtaining as few as two enrollment templates, and none of the enrollment templates need have overlapping portions. That is to say, when obtaining information about the biometric object used to enroll an individual into an authentication system, the images of that biometric object may be obtained without regard to whether one image overlaps with another image. Consequently, an individual that desires to be enrolled in an authentication system may be enrolled more quickly through use of fewer enrollment templates, and/or the enrollment process may be completed more quickly and with less computing time since a stitched image is not required. In some implementations, the enrollment templates may be matched one by one with an inquiry template, fused, and an intermediate composite match score generated. In this manner, if a sufficiently high composite match score is generated with only a subset of the stored enrollment templates, then a potential user may be authenticated without use of all the stored templates, thus saving time, improving latency, reducing power, and allowing a user quicker access. Note that in this approach, an intermediate composite matching score may be sufficient while matching with as few as one stored template. In some implementations, the order of template matching may be improved to reduce latency by placing the templates with the highest quality value or those most-often successfully matched to a user early in the order. The order of template matching may evolve over time as more authentication/verification processes for a specific user are successfully completed.

Figure 2:
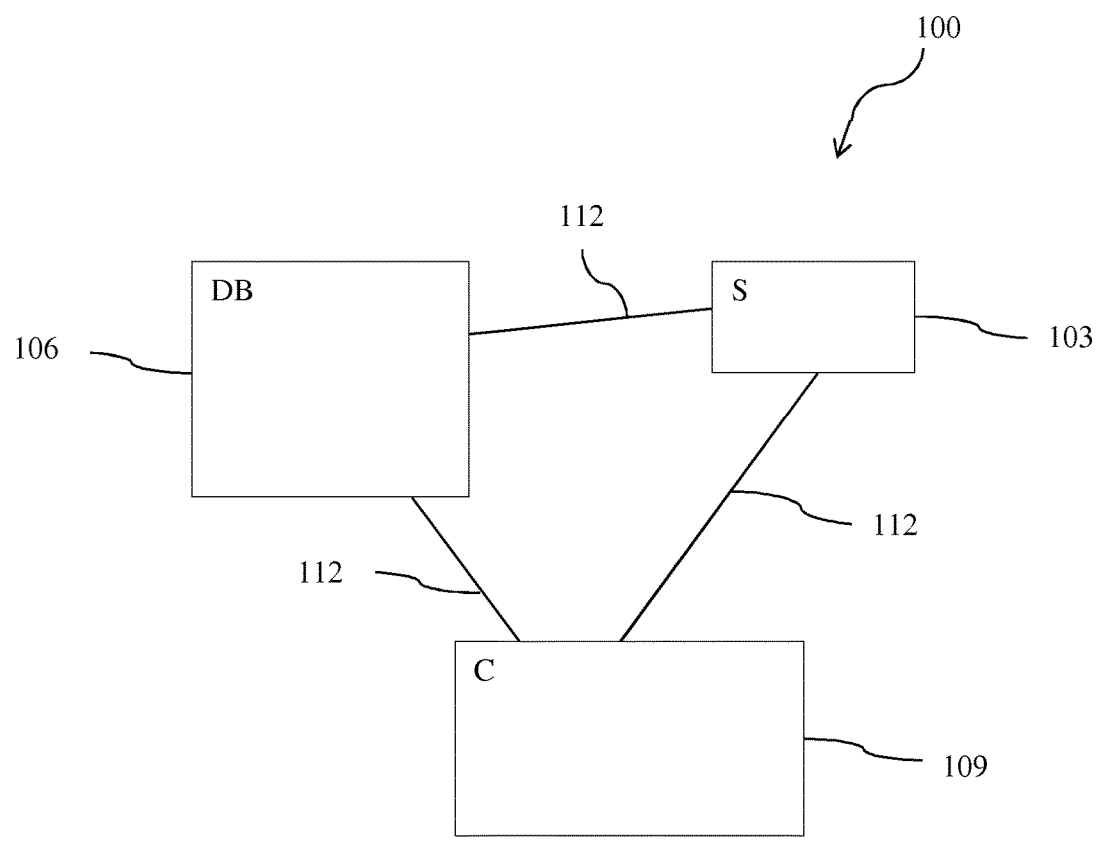
FIG. 2 depicts a system for authenticating an individual including a computer, a database and a biometric sensor.
Figure 3:
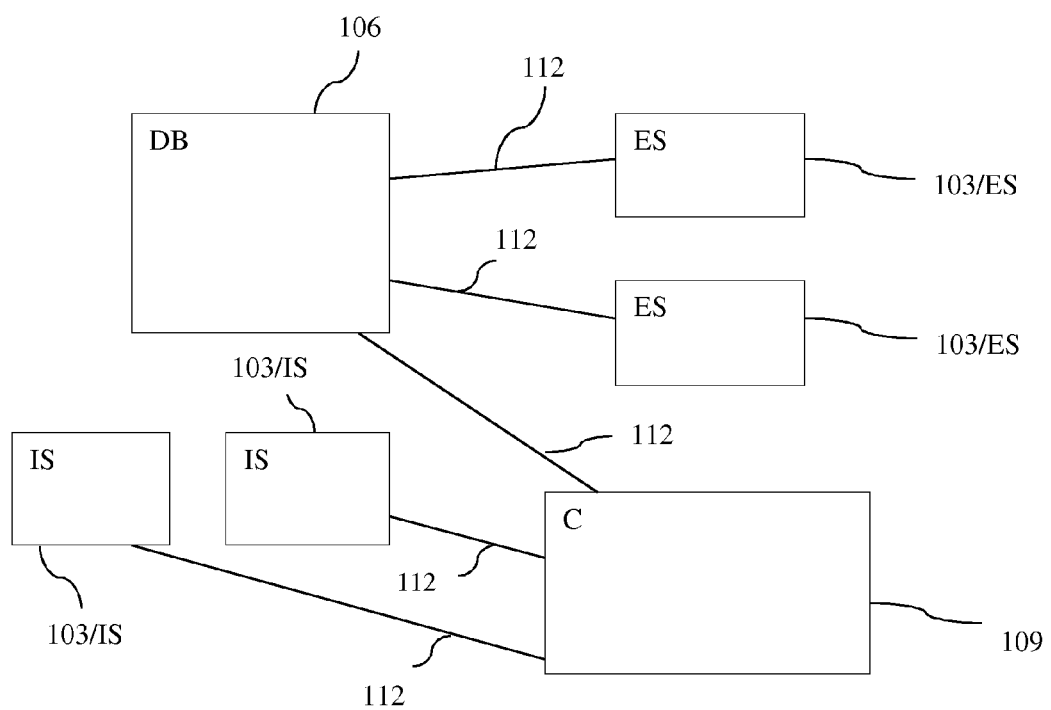
FIG. 3 depicts a system for authenticating an individual including a computer, a database and one or more enrollment and/or inquiry sensors.

FIG. 2 is a block diagram illustrating a system 100 for authenticating an individual. One such system has one or more biometric sensors 103, at least one database 106 with a memory having the ability to store information, at least one computer or processor 109, and communications links 112 that may be provided between some or all of these components 103, 106, and 109. FIG. 2 depicts a system 100 including a computer or processor 109, a database 106, and a single biometric sensor 103, and FIG. 3 depicts a system 100 including one or more enrollment and/or inquiry sensors 103. The sensors 103 may each be an area-array sensor. The sensors 103 may each be an ultrasonic area-array sensor. In the implementation shown in FIG. 2, the biometric sensor 103 may serve both as the enrollment sensor and as the inquiry sensor, such as may be found in a mobile device. When more than one sensor 103 is used in system 100 as shown in FIG. 3, one or more of the sensors 103/ES may be used for enrolling individuals to obtain enrollment templates from an enrollment biometric (such as an enrollment finger), and others of the sensors 103/IS may be used to obtain inquiry templates from an inquiry biometric (such as an inquiry finger) in a distributed system. The enrollment templates and inquiry templates may include information data sets describing features of a friction-ridge surface of the enrollment finger, and the inquiry biometric may include an information data set describing features of a friction-ridge surface of the inquiry finger.

The system 100 may include a database 106 that is in communication with at least the enrollment biometric sensors 103/ES, and possibly the inquiry biometric sensors 103/IS. In some implementations, the database 106 may be a remote database. In some implementations, a local memory such as a memory in a secure portion of a local processor may be configured to hold the database and may contain the template information such as the enrollment templates and the inquiry template. The database 106 may be referred to as a template repository elsewhere in this disclosure. The system 100 may include a computer 109 that is in communication with the database 106, and possibly the inquiry biometric sensors 103/IS. The database 106 may be used to store enrollment templates (and possibly inquiry templates) that may be used by the computer 109 during an authentication procedure, such as those described above. The computer 109 may be programmed to produce at least a first match score by comparing an inquiry template with a first enrollment template, and to produce a second match score by comparing the inquiry template with a second enrollment template. In addition, the computer 109 may be programmed to mathematically fuse the match scores (which may be weighted match scores) to produce a composite match score, and then compare the composite match score to an acceptance range. The programming of the computer 109 may be such that if the computer 109 determines that the composite match score is within the acceptance range, then the computer 109 may provide an indication authenticating the individual.

Some fingerprint sensors may have sufficient active area to image an entire fingerprint with a single scan. More recently, the active area of button-based fingerprint sensors such as those from some of the premium-tier cell phone manufacturers is much reduced in size yet square. Some ultrasonic fingerprint sensors are rectangular with active areas such as 4 mm×9 mm or 3 mm×8 mm to allow inclusion in rectangular buttons or to fit in the small region behind a cover glass and below a display area of a mobile device, such as a cell phone. Sensors with square or rectangular active areas may be required in order to correctly match and validate users that have enrolled their fingers with the mobile device, even if a user wishes to position their fingers at widely varying angles with respect to the device while being authenticated. Current enrollment policies may require the user to enroll a finger while positioning the finger with essentially the same angle during image acquisition. It is desirable to allow verification of an enrolled user in order to gain access to a mobile device with whatever rotation angle the user desires (e.g. +/−45 degrees, +/−60 degrees, +/−90 degrees, 180 degrees or other angle) without reducing the accuracy and speed at which the user can be verified.

To improve finger enrollment and matching/verification sequences with fingerprint sensors having small, rectangular active areas for use in small, rectangular home buttons and authenticating fingerprint sensors at the bottom of cell phones, enrollment may be done with the finger rotating with respect to the sensor while images of the finger are acquired. A user may be instructed by the enrollment application to place the finger in various, pre-specified positions (e.g. 0, +/−45 and +/−90 degrees). This is in contrast to systems that enroll fingers in a single position (i.e. a vertical position) and then attempt to match at different angles. A problem using a single direction for the finger on a rectangular sensor is that enrollment may result in minimal overlap between an enrolled image (e.g. a template) and a match attempt, potentially resulting in a low matching score and therefore increasing the possibility that an authorized user will not be verified and thus denied access to his/her cell phone. Reducing match thresholds to allow for low matching scores potentially allows an imposter to gain access to the system and is therefore undesirable. Allowing for and requesting rotation of the finger during enrollment as proposed here mitigates this problem by ensuring sufficient fingerprint area is captured during enrollment so as to allow subsequent matching at different angles (e.g. at any angle 0 through 360 degrees) and to have a minimal angle difference between at least one of the enrolled images. Increasing the overlap between enrolled and matched images improves the false accept ratio (FAR) while reducing the false reject ratio (FRR). In some implementations, the enrollment templates may be augmented with an enrollment-data field (i.e., metadata) indicating the offset angle requested of the user during enrollment of a finger (e.g. 0, +/−45 or +/−90 degrees). For example, the cued angled or finger direction may be stored as metadata with each template. Additionally, an adaptive technique may be employed by the matching sequence to compile a list of finger orientation angles generally used by the enrolled user during verification, and to use this list along with the cued orientation-angle metadata as specified in the corresponding enrollment-data field to guide the matching/verification sequence on which stored template(s) to attempt to match first, resulting in potentially higher accuracy and lower latency.

Figure 4:
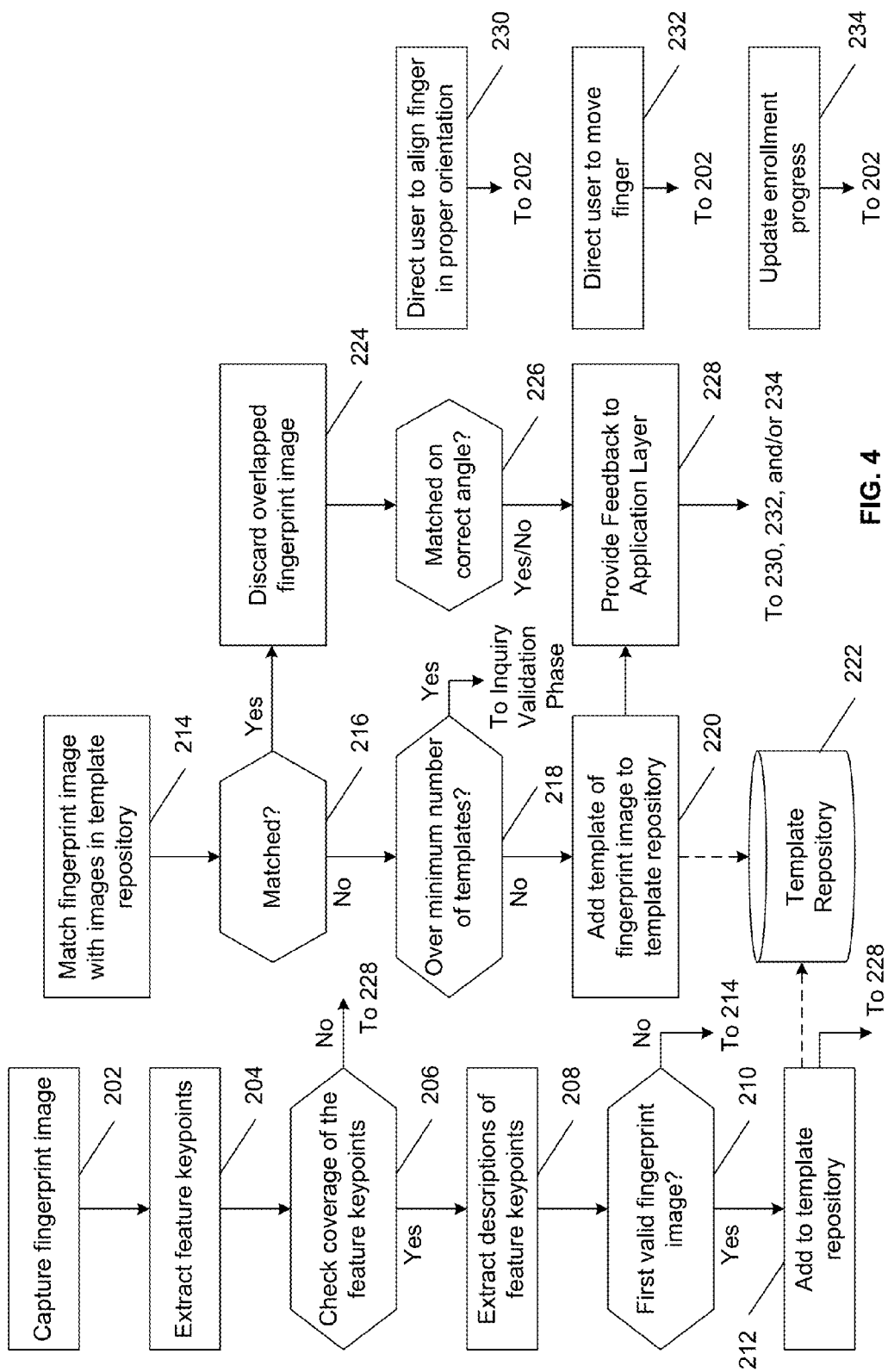
FIG. 4 illustrates an exemplary implementation of enrollment of a user's fingerprint images according to aspects of the present disclosure.

FIG. 4 illustrates an exemplary implementation of enrollment of a user's fingerprint images according to aspects of the present disclosure. As shown in FIG. 4, in block 202, the method captures a fingerprint image. In block 204, the method extracts feature keypoints from the fingerprint image captured. In block 206, the method checks the coverage and distributions of the feature keypoints with respect to the fingerprint image captured. If there is sufficient coverage of the fingerprint image by the feature keypoints (206_Yes), the method moves to block 208. Alternatively, if there is insufficient coverage of the fingerprint image by the feature keypoints (206_No), the method moves to block 228. In block 208, the method extracts descriptions of the feature keypoints of the fingerprint image.

In block 210, the method determines whether the fingerprint image captured is a first valid fingerprint image. If the fingerprint image captured is a first valid fingerprint image (210_Yes), the method moves to block 212. On the other hand, if the fingerprint image captured is not a first valid fingerprint image (210_No), the method moves to block 214. In block 212, the method adds the template of the fingerprint image to a template repository 222, and then moves to block 228.

In block 214, the method attempts to match the template of fingerprint image captured with one or more templates of images in the template repository 222; it then moves to block 216. In block 216, the method determines whether there is a match between the template of fingerprint image captured and the templates of one or more images in the template repository 222. If there is a match (216_Yes), the method moves to block 224. Otherwise, if there is not a match (216_No), the method moves to block 218.

In block 218, the method determines whether the number of templates (descriptions of the fingerprint images) associated with a user's fingerprint in the template repository 222 exceeds a minimum number of templates. In some implementations, a template may include at least one of: 1) descriptions of feature keypoints; 2) minutiae template; 3) pattern matching template; or any combination thereof. If the number of templates exceeds a minimum number of templates (218_Yes), the method exits the enrollment phase (also referred to as the template repository collection phase) and moves to a fingerprint inquiry validation phase, which is described below in association with FIG. 5. Alternatively, if the number of templates does not exceed a minimum number of templates (218_No), the method moves to block 220. In block 220, the method adds the template of the fingerprint image to the template repository 222, and then moves to block 228.

In block 224, the method discards the overlapped (matched) fingerprint image. In block 226, the method determines whether the overlapped fingerprint image is matched on correct angle. Whether the overlapped fingerprint image is matched on correct angle or not, in both situations the method moves to block 228, but different feedback messages and/or instructions may be provided to the user depending on the outcome of whether the overlapped fingerprint image is matched on the correct angle.

In block 228, the method provides feedback to the application layer, and then it may move to one or more of the blocks 230, 232, and/or 234. In block 230, the application layer may direct the user to align finger in proper orientation in the event of the overlapped fingerprint image is not matched on correct angle. Then, the method may move back to block 202. In block 232, the application layer may direct the user to move the finger in the event of the overlapped fingerprint image is matched on correct angle. In addition, the application layer may direct the user to move the finger to get a better coverage of the sensor area as in the case when there is insufficient coverage of the fingerprint image by the feature keypoints as determined in block 206. After block 232, the method moves back to block 202. In block 234, the application layer may provide an update of the enrollment progress to the user. For example, if a template of a fingerprint image is successfully added to the template repository 222, a forward progress may be shown to the user. On the other hand, if the method cannot use the fingerprint image captured, for example due to insufficient coverage by the feature keypoints, then the progress bar (not shown) may not advance or a negative progress may be shown to the user. After block 234, the method moves back to block 202.

Figure 5:
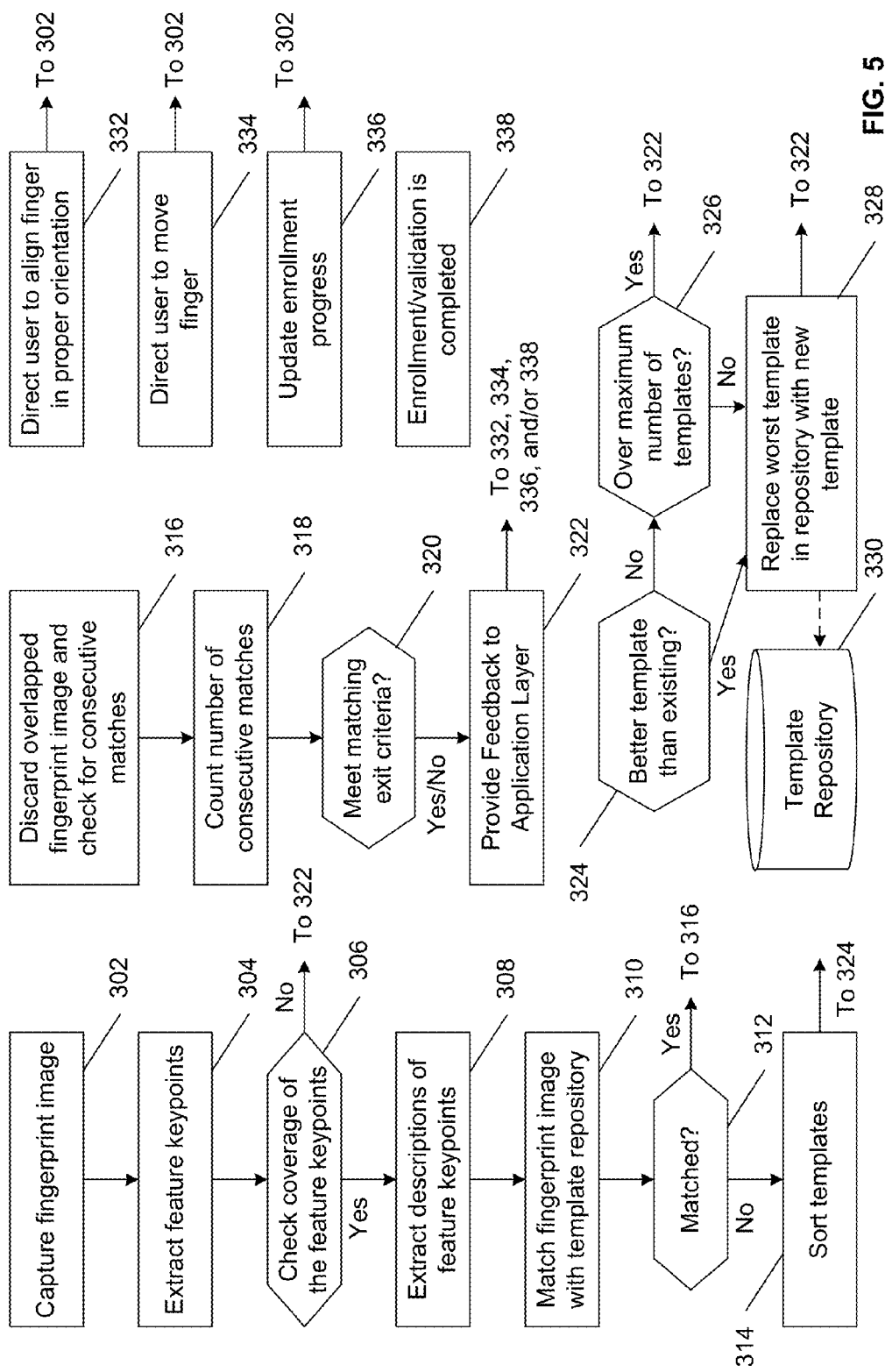
FIG. 5 illustrates an exemplary implementation of validation of a user's fingerprint image(s) according to aspects of the present disclosure.

FIG. 5 illustrates an exemplary implementation of validation of a user's fingerprint image(s) according to aspects of the present disclosure. In the exemplary implementation shown in FIG. 5, in block 302, the method captures a fingerprint image. In block 304, the method extracts feature keypoints from the fingerprint image captured. In block 306, the method checks the coverage and distributions of the feature keypoints with respect to the fingerprint image captured. If there is sufficient coverage of the fingerprint image by the feature keypoints (306_Yes), the method moves to block 308. Alternatively, if there is insufficient coverage of the fingerprint image by the feature keypoints (306_No), the method moves to block 322. In block 308, the method extracts descriptions of the feature keypoints of the fingerprint image.

In block 310, the method attempts to match the template of fingerprint image captured with one or more templates of images in a template repository 330; it then moves to block 312. In block 312, the method determines whether there is a match between the template of fingerprint image captured and the one or more templates of images in the template repository 330. If there is a match (312_Yes), the method moves to block 316. Otherwise, if there is not a match (312_No), the method moves to block 314.

In block 316, the method discards the overlapped (matched) fingerprint image, and checks for consecutive matches. In block 318, the method counts the number of consecutive matches (for example 5 consecutive matches). Note that in some implementations, instead of checking for consecutive matches, the method may check for a percentage of matches in block 316 and may count the percentage of matches (such as 80% of matches) among a plurality of checks in block 318.

In block 320, the method determines whether the matching exit criteria have been met. Whether the matching exit criteria have been met or not, in both situations the method moves to block 322, but different feedback messages and/or instructions may be provided to the user depending on the outcome of whether the matching exit criteria have been met.

In block 314, the method sorts the templates in the template repository 330. In block 324, the method determines whether the fingerprint image is a better template than the existing templates of images in the template repository 330. If the fingerprint image is a better template than at least one of the existing templates of images in the template repository 330 (324_Yes), the method moves to block 328.

Alternatively, if the fingerprint image is not a better template than at least one of the existing templates of images in the template repository 330 (324_No), the method moves to block 326.

In block 326, the method determines whether the number of templates associated with a user's finger in the template repository has exceeded a maximum number of templates. If the number of templates has exceeded a maximum number of templates (326_Yes), the method moves to block 322. On the other hand, if the number of templates has not exceeded a maximum number of templates (326_No), the method moves to block 328. In block 328, the method replaces the worst template in the template repository 330 with the template of the fingerprint image, which is considered as a new template. The method then moves to block 322.

In block 322, the method provides feedback to the application layer, and then it may move to one or more of the blocks 332, 334, 336, and/or 338. In block 332, the application layer may direct the user to align finger in proper orientation. Then, the method may move back to block 302. In block 334, the application layer may direct the user to move the finger to get a better coverage of the sensor area as in the case when there is insufficient coverage of the fingerprint image by the feature keypoints as determined in block 306. After block 334, the method moves back to block 302. In block 336, the application layer may provide an update of the enrollment and/or validation progress to the user. For example, if the number of consecutive matches or the percent of matches meets the matching exit criteria, a forward progress may be shown to the user. On the other hand, if the method cannot use the fingerprint image captured, for example due to insufficient coverage by the feature keypoints or due to the maximum number of templates in the template repository has been exceeded, then the progress bar (not shown) may not advance or a negative progress may be shown to the user. After block 336, the method moves back to block 302. In block 338, the user may be notified that the enrollment and/or validation have been completed.

Figure 6:
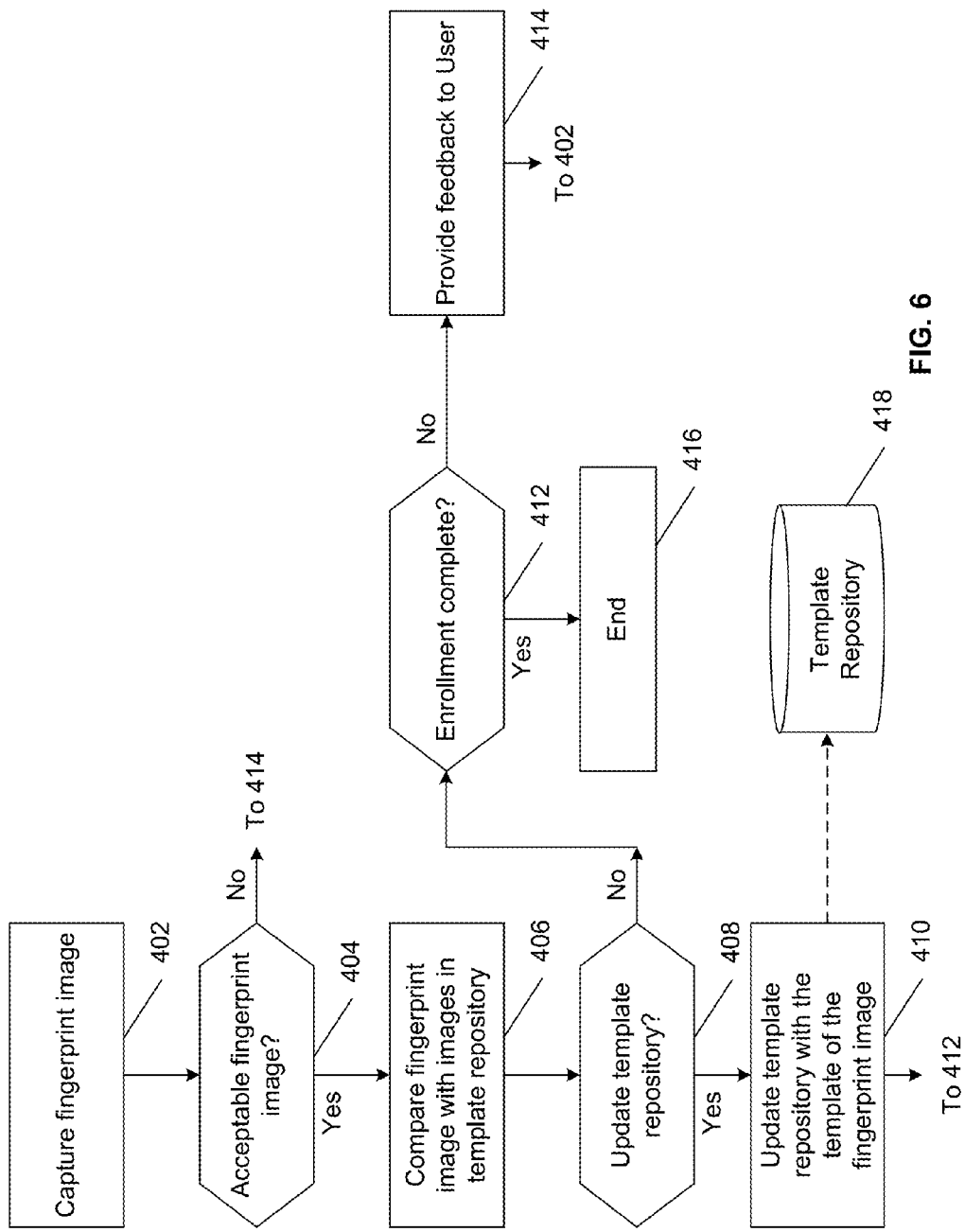
FIG. 6 illustrates another implementation of enrollment of a user's fingerprint images according to aspects of the present disclosure.

FIG. 6 illustrates another implementation of enrollment of a user's fingerprint images according to aspects of the present disclosure. In the example shown in FIG. 6, in block 402, the method captures a fingerprint image. In block 404, the method determines whether the fingerprint image captured is acceptable. In some implementations, the methods performed in blocks 204 and 206 of FIG. 4 may be performed in block 404. If the fingerprint image captured is acceptable (404_Yes), the method moves to block 406. Otherwise, if the fingerprint image captured is not acceptable (404_No), the method moves to block 414.

In block 406, the method compares the template of the fingerprint image with one or more templates of the images stored in the template repository 418. In some implementations, the methods performed in blocks 208 and 214 of FIG. 4 may be performed in block 406. In block 408, the method determines whether to update the template repository 418 with the template of the fingerprint image. In some implementations, the methods performed in blocks 210, 216, and 218 of FIG. 4 may be performed in block 408. If it is determined to update the template repository 418 with the template of the fingerprint image (408_Yes), the method moves to block 410. Alternatively, if it is determined not to update the template repository 418 with the template of the fingerprint image (408_No), the method moves to block 412.

In block 410, the method updates the template repository 418 with the template of the fingerprint image. In some implementations, the methods performed in blocks 212 and 220 of FIG. 4 may be performed in block 410. In block 412, the method determines whether the enrollment (also referred to as the template repository collection phase) has been completed. In some implementations, the method performed in block 218 of FIG. 4 may be performed in block 412. If the enrollment has been completed (412_Yes), the method ends in block 416. Otherwise, if the enrollment has not been completed (412_No), the method moves to block 414.

In block 414, the method provides feedback about the status of the enrollment progress to the user, and then moves to block 402. In some implementations, the methods performed in blocks 228, 230, 232, and/or 234 of FIG. 4 may be performed in block 414. For example, the method may provide feedback to the user through an application layer. The application layer may direct the user to align finger in proper orientation in the event of the overlapped fingerprint image is not matched on correct angle. In addition, the application layer may direct the user to move the finger in the event of an overlapped fingerprint image is matched on correct angle. The application layer may also direct the user to move the finger to get a better coverage of the sensor area as in the case when the fingerprint image is not acceptable as determined in block 404. Moreover, the application layer may provide an update of the enrollment progress to the user. After a fingerprint image has been successfully added to the template repository 418, a forward progress may be shown to the user. On the other hand, if the fingerprint image is not acceptable as determined in block 404, for example due to insufficient coverage by the feature keypoints, then the progress bar (not shown) may not advance or a negative progress may be shown to the user.

Figure 7:
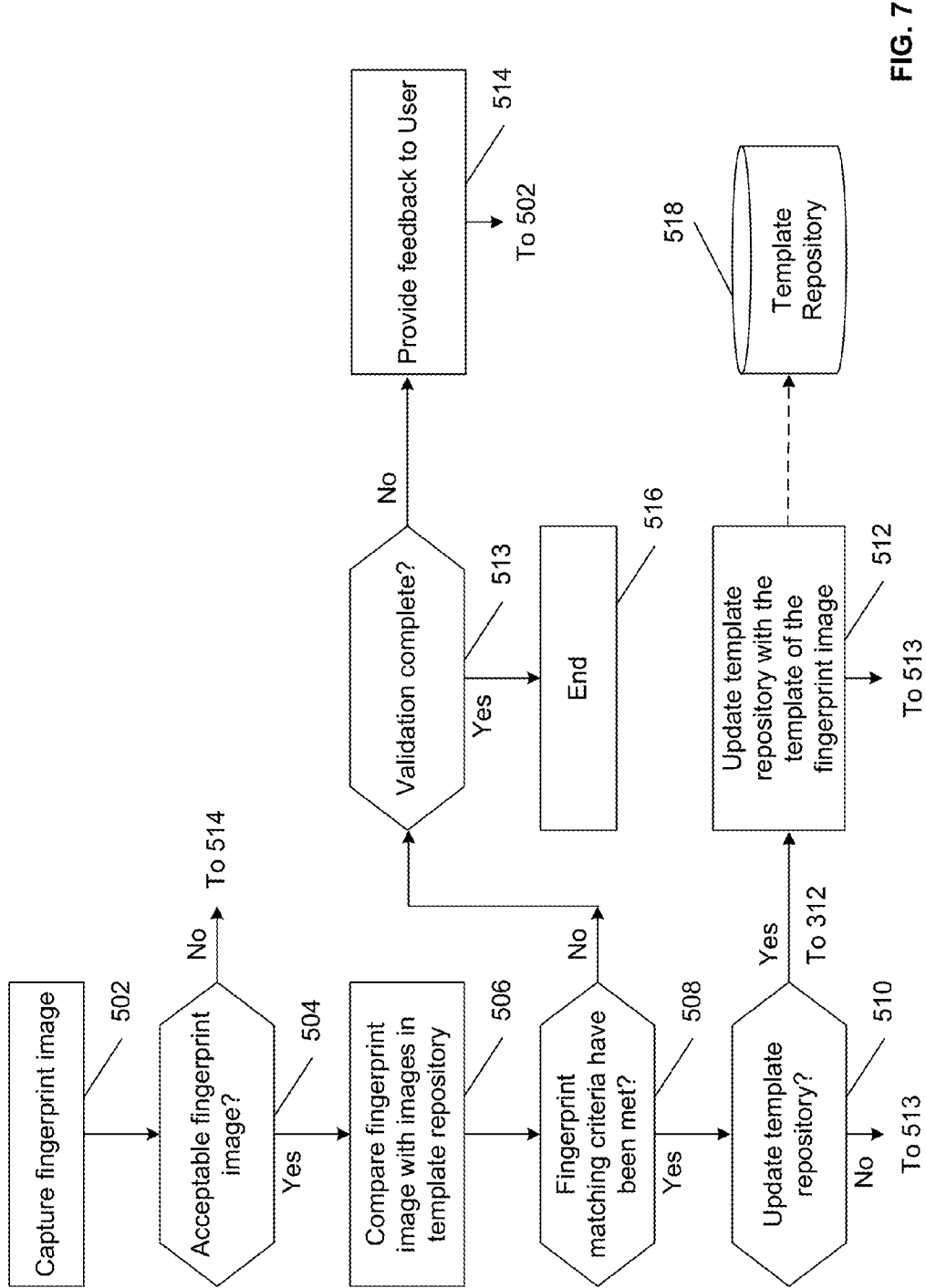
FIG. 7 illustrates another implementation of validation of a user's fingerprint image(s) according to aspects of the present disclosure.

FIG. 7 illustrates another implementation of validation of a user's fingerprint image(s) according to aspects of the present disclosure. As shown in FIG. 7, in block 502, the method captures a fingerprint image. In block 504, the method determines whether the fingerprint image captured is acceptable. In some implementations, the methods performed in blocks 304 and 306 of FIG. 5 may be performed in block 504. If the fingerprint image captured is acceptable (504_Yes), the method moves to block 506. Otherwise, if the fingerprint image captured is not acceptable (504_No), the method moves to block 514. In block 506, the method compares the template of the fingerprint image with the templates of the one or more images stored in the template repository 518. In some implementations, the methods performed in blocks 308 and 310 of FIG. 5 may be performed in block 506.

In block 508, the method determines whether the fingerprint matching criteria have been met. In some implementations, the methods performed in block 312 of FIG. 5 may be performed in block 508. If the fingerprint matching criteria have been met (508_Yes), the method moves to block 510. On the other hand, if the fingerprint matching criteria have not been met (508_No), the method moves to block 513.

In block 510, the method determines whether to update the template repository 518 with the fingerprint image. In some implementations, the methods performed in blocks 314, 324, and 326 of FIG. 5 may be performed in block 510. If it is determined to update the template repository 518 with the template of the fingerprint image (510_Yes), the method moves to block 512. Alternatively, if it is determined not to update the template repository 518 with the template of the fingerprint image (510_No), the method moves to block 513. In block 512, the method updates the template repository 518 with the template of the fingerprint image, and then moves to block 513. In some implementations, the method performed in block 328 of FIG. 5 may be performed in block 512.

In block 513, the method determines whether the fingerprint inquiry validation phase has been completed. In some implementations, the method performed in blocks 316, 318, and 320 of FIG. 5 may be performed in block 513. If it is determined that the fingerprint inquiry validation phase has been completed (513_Yes), the method ends in block 516. Otherwise, if it is determined that the fingerprint inquiry validation phase has not been completed (513_No), the method moves to block 514.

In block 514, the method provides feedback about the status of the enrollment and/or validation progress to the user, and then moves to block 502. In some implementations, the methods performed in blocks 322, 332, 334, and/or 336 of FIG. 5 may be performed in block 514. For example, the method may provide feedback to the user through an application layer. The application layer may direct the user to align finger in proper orientation. In addition, the application layer may direct the user to move the finger. The application layer may also direct the user to move the finger to get a better coverage of the sensor area as in the case when the fingerprint image is not acceptable as determined in block 504. Moreover, the application layer may provide an update of the enrollment and/or validation progress to the user. After a number of successful matches have been identified, a forward progress or an enrollment/validation completion message may be shown to the user. On the other hand, if the fingerprint image is not acceptable as determined in block 504, for example due to insufficient coverage by the feature keypoints, then the progress bar (not shown) may not advance or a negative progress may be shown to the user.

Figure 8A:
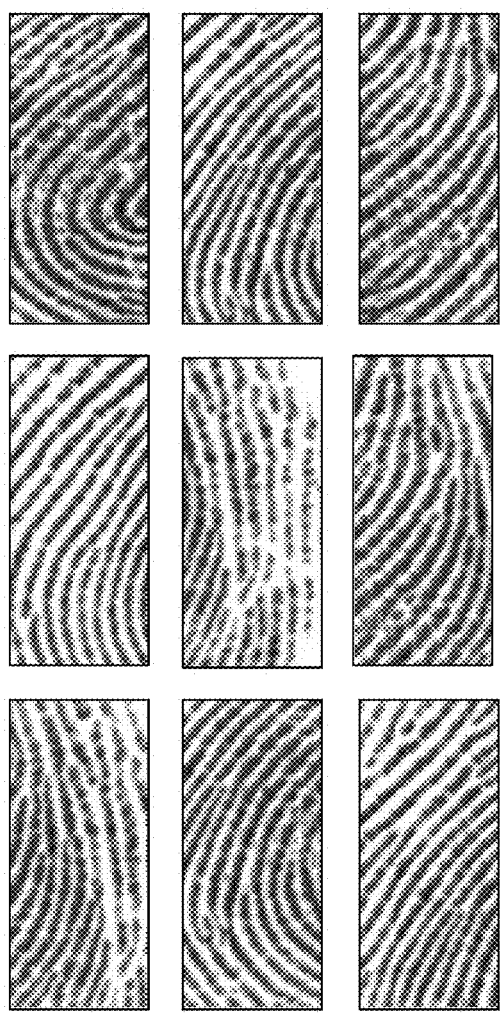
FIG. 8A illustrates an example of a set of fingerprint images stored in a template repository and FIG. 8B illustrates examples of rejected fingerprint images that may not be added to the template repository according to aspects of the present disclosure.
Figure 8B:
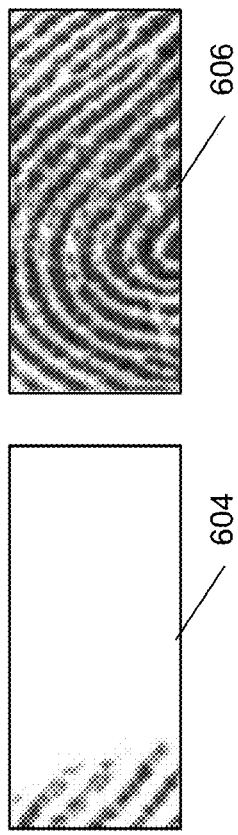

FIG. 8A illustrates an example of a set of fingerprint images stored in a template repository. In some implementations, a set of templates that correspond to the set of fingerprint images are stored in the template repository. According to aspect of the present disclosure, a template may include at least one of: 1) descriptions of feature keypoints; 2) minutiae template; 3) pattern matching template; or any combination thereof. As shown in FIG. 8A, a set of fingerprint images 602 correspond to a plurality of fingerprint images of a user collected in the template repository. In some implementations, each image in the set of fingerprint images 602 may represent a section of a single finger of the user. In some other implementations, the set of fingerprint images 602 may represent sections of images collected from multiple fingers from the user. FIG. 8B illustrates examples of rejected fingerprint images or the templates of the rejected fingerprint images that may not be added to the template repository according to aspects of the present disclosure. In the example shown in FIG. 8B, a first fingerprint image 604 may be rejected due to insufficient number of feature keypoints in this fingerprint image. A second fingerprint image 606 may be rejected because it may be a sufficiently overlapped image with respect to the set of fingerprint images 602 of the user in the template repository.

Figure 9:
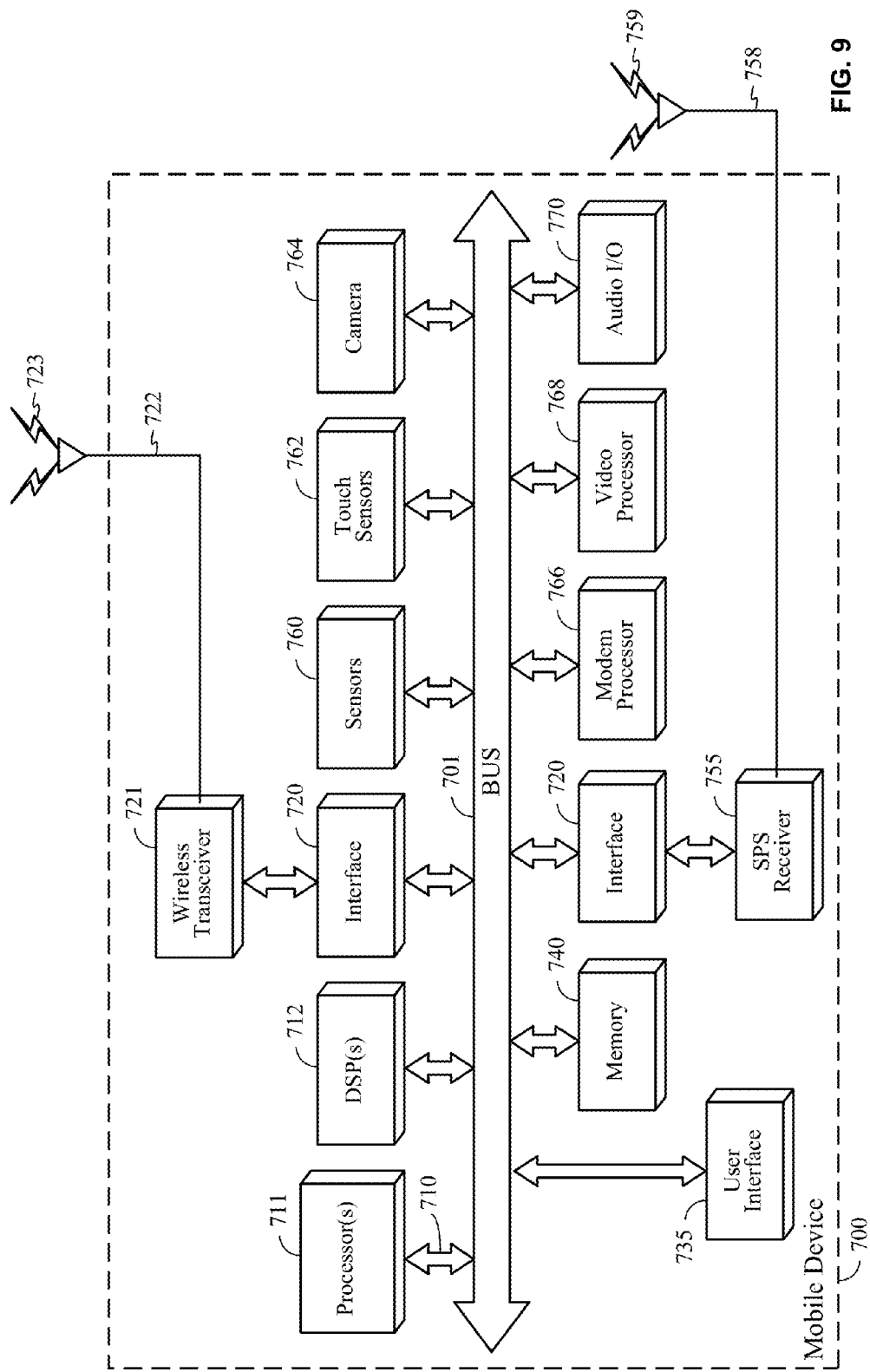
FIG. 9 illustrates an exemplary block diagram of a device that may be configured to implement methods of interactive user fingerprint authentication according to aspects of the present disclosure.

FIG. 9 illustrates an exemplary block diagram of a device that can be configured to implement methods of interactive user fingerprint authentication according to aspects of the present disclosure. A device may comprise one or more features of mobile device 700 shown in FIG. 9. In certain embodiments, mobile device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also comprise SPS receiver 755 capable of receiving and acquiring SPS signals 759 via SPS antenna 758. SPS receiver 755 may also process, in whole or in part, acquired SPS signals 759 for estimating a location of a mobile device. In some embodiments, processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals may be performed in memory 740 or registers (not shown).

Also shown in FIG. 9, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless STA as discussed above. Processor(s) 711 and/or DSP(s) 712 may execute instructions to execute one or more aspects of processes/methods discussed below in connection with FIG. 10. Processor(s) 711 and/or DSP(s) 712 may perform the methods and/or functions as described in FIGS. 3 through 8A-8B, and 10A-10C.

Also shown in FIG. 9, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figures 10A, 10B:
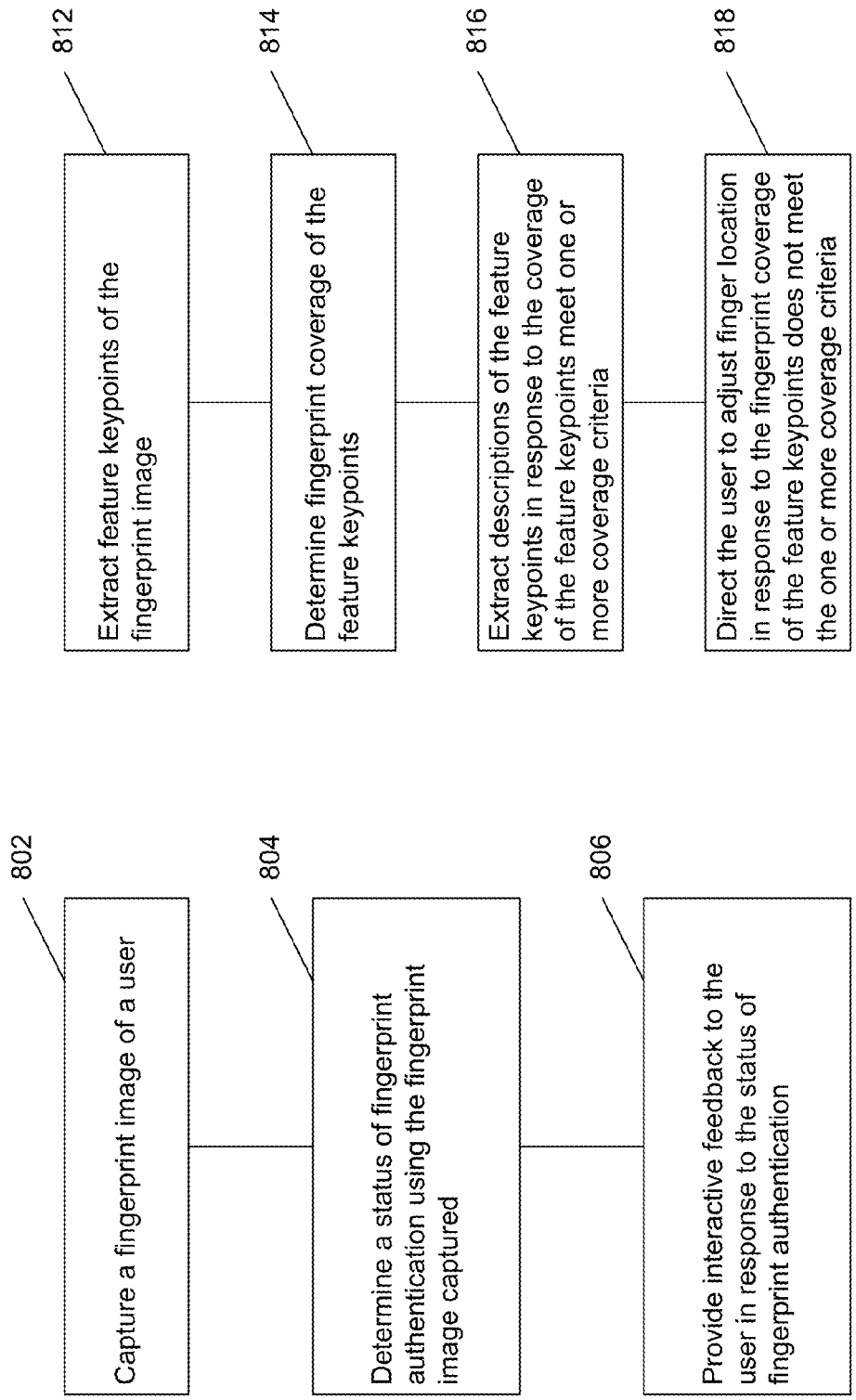
FIG. 10A illustrates an exemplary flow chart for implementing methods of interactive user fingerprint authentication.
FIG. 10B illustrates an exemplary flow chart for implementing methods of determining a status of fingerprint authentication.

FIG. 10A illustrates an exemplary flow chart for implementing methods of interactive user fingerprint authentication according to aspects of the present disclosure. In block 802, the method captures a fingerprint image of a user. In block 804, the method determines a status of fingerprint authentication using the fingerprint image captured. In block 806, the method provides interactive feedback to the user in response to the status of fingerprint authentication.

FIG. 10B illustrates an exemplary flow chart for implementing methods of determining a status of fingerprint authentication according to aspects of the present disclosure. In block 812, the method extracts feature keypoints of the fingerprint image. In block 814, the method determines fingerprint coverage of the feature keypoints. In block 816, the method extracts descriptions of the feature keypoints in response to the coverage of the feature keypoints meet one or more coverage criteria. In block 818, the method directs the user to adjust finger location in response to the fingerprint coverage of the feature keypoints does not meet the one or more coverage criteria.

Figure 10C:
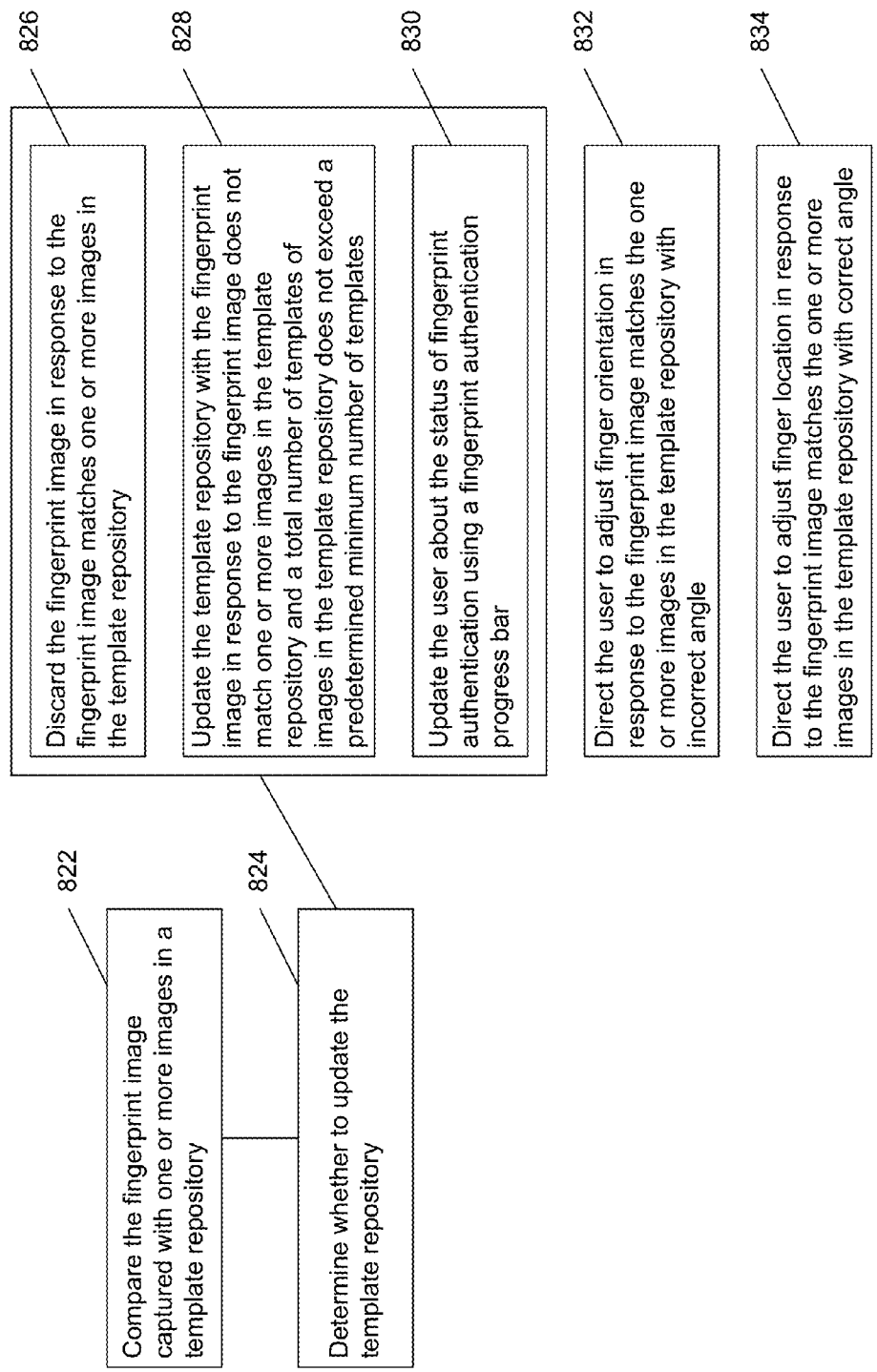
FIG. 10C illustrates another exemplary flow chart for implementing methods of determining a status of fingerprint authentication according to aspects of the present disclosure.

FIG. 10C illustrates another exemplary flow chart for implementing methods of determining a status of fingerprint authentication according to aspects of the present disclosure. In block 822, the method compares the template of the fingerprint image captured with the templates of the one or more images in a template repository. According to aspects of the present disclosure, a template may include at least one of: 1) descriptions of feature keypoints; 2) minutiae template; 3) pattern matching template; or any combination thereof. In addition, a description of comparing two images may also include comparing the templates of the two images. In block 824, the method determines whether to update the template repository. According to aspects of the present disclosure, the method performed in block 824 may further include the methods performed in block 826, block 828, and block 830. In block 826, the method discards the fingerprint image in response to the fingerprint image matches one or more images in the template repository. In block 828, the method updates the template repository with the template of the fingerprint image in response to the template of the fingerprint image does not match one or more templates of images in the template repository and a total number of templates of images in the template repository does not exceed a predetermined minimum number of templates. In block 830, the method updates the user about the status of fingerprint authentication using a fingerprint authentication progress bar.

According to aspects of the present disclosure, the method may further provide interactive feedback to the user in response to the status of fingerprint authentication as shown in block 832 and block 834. In block 832, the method directs the user to adjust finger orientation in response to the fingerprint image matches the one or more images in the template repository with an incorrect angle. In block 834, the method directs the user to adjust finger location in response to the fingerprint image matches the one or more images in the template repository with a correct angle.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method of authenticating an individual, comprising:
producing a first match score by comparing a fingerprint inquiry template and a first fingerprint enrollment template, wherein the first fingerprint enrollment template is associated with the individual and was produced by scanning a portion of a friction-ridge surface of an enrollment finger of the individual, wherein the fingerprint inquiry template was previously produced by scanning a portion of a friction-ridge surface of a finger;
producing a second match score by comparing the fingerprint inquiry template and a second fingerprint enrollment template, wherein the second fingerprint enrollment template is also associated with the individual and was produced by scanning another portion of the friction-ridge surface of the enrollment finger of the individual;

adding a plurality of match scores together to produce a composite match score sum, wherein:
the first match score and the second match score are match scores in the plurality of match scores,
each match score was produced by comparing the fingerprint inquiry template against a different fingerprint enrollment template of a plurality of fingerprint enrollment templates associated with the individual,
the first fingerprint enrollment template and the second fingerprint enrollment template are included in the plurality of fingerprint enrollment templates, and
at least one of the match scores in the plurality of match scores is multiplied by a weighting factor prior to being added to the other match scores in the plurality of match scores to produce the composite match score sum; and
authenticating the individual by comparing the composite match score sum to an acceptance range, wherein:
each weighting factor is based on a quality value associated with the fingerprint enrollment template for which the match score that is to be multiplied by that weighting factor was produced, and
the quality value is based on one or more items selected from the group consisting of: image contrast of the fingerprint enrollment template associated with the quality value and a signal-to-noise ratio of the fingerprint enrollment template associated with the quality value.

2. The method of claim 1, wherein the fingerprint inquiry template is based on data representing a scan of a portion of a friction ridge surface of a finger carried out by an area-array sensor.

3. The method of claim 1, wherein the fingerprint inquiry template is based on data representing a scan of a portion of a friction ridge surface of a finger carried out by an ultrasonic sensor.

4. The method of claim 1, wherein each of the match scores in the plurality of match scores is multiplied by a corresponding weighting factor prior to being added to the other match scores in the plurality of match scores to produce the composite match score sum.

5. The method of claim 1, further comprising:
determining that the fingerprint inquiry template is better quality than one or more of the fingerprint enrollment templates,
discarding the fingerprint enrollment template with the worst quality, and
replacing the discarded fingerprint enrollment template with the fingerprint inquiry template, thereby making the fingerprint inquiry template one of the fingerprint enrollment templates.

6. The method of claim 1, wherein the quality value associated with each fingerprint enrollment template is based on the image contrast of the fingerprint enrollment template associated with that quality value.

7. The method of claim 1, wherein the quality value associated with each fingerprint enrollment template is based on the signal-to-noise ratio for the fingerprint enrollment template associated with that quality value.

8. The method of claim 1, wherein the quality value associated with each fingerprint enrollment template is additionally based on how much the fingerprint inquiry template overlaps with the fingerprint enrollment template associated with that quality value.

9. The method of claim 1, further comprising allowing the individual to access a mobile device based on the authenticating.

10. The method of claim 1, further comprising allowing the individual to access a computer based on the authenticating.

11. A system for authenticating an individual, comprising:
a fingerprint enrollment template database, the fingerprint enrollment database storing a plurality of fingerprint enrollment templates including a first fingerprint enrollment template and a second fingerprint enrollment template that are both associated with the individual, wherein the first fingerprint enrollment template was produced by scanning a portion of a friction-ridge surface of an enrollment finger of the individual and the second fingerprint enrollment template was produced by scanning another portion of the friction-ridge surface of the enrollment finger of the individual; and
at least one processor and a memory, wherein the at least one processor is in communication with the fingerprint enrollment template database and the memory and the memory stores computer-executable instructions for causing the at least one processor to:
obtain a fingerprint inquiry template produced by scanning a portion of a friction-ridge surface of a finger;
produce a first match score by comparing the fingerprint inquiry template to the first enrollment template;
produce a second match score by comparing the fingerprint inquiry template to the second enrollment template;
add a plurality of match scores together to produce a composite match score sum, wherein:
the first match score and the second match score are match scores in the plurality of match scores,
each match score is produced by comparing the fingerprint inquiry template against a different fingerprint enrollment template of a plurality of fingerprint enrollment templates associated with the individual,
the first fingerprint enrollment template and the second fingerprint enrollment template are included in the plurality of fingerprint enrollment templates, and
at least one of the match scores in the plurality of match scores is multiplied by a weighting factor prior to being added to the other match scores in the plurality of match scores to produce the composite match score sum; and
authenticate the individual by comparing the composite match score sum to an acceptance range, wherein:
each weighting factor is based on a quality value associated with the fingerprint enrollment template for which the match score that is to be multiplied by that weighting factor was produced, and
the quality value is based on one or more items selected from the group consisting of: image contrast of the fingerprint enrollment template associated with the quality value and a signal-to-noise ratio of the fingerprint enrollment template associated with the quality value.

12. The system of claim 11, further comprising a biometric area-array sensor configured to obtain the fingerprint inquiry template.

13. The system of claim 11, further comprising an ultrasonic sensor configured to obtain the fingerprint inquiry template.

14. The system of claim 11, wherein each of the match scores in the plurality of match scores is multiplied by a corresponding weighting factor prior to being added to the other match scores in the plurality of match scores to produce the composite match score sum.

15. The system of claim 11, wherein the memory further stores computer-executable instructions for further causing the at least one processor to:
   determine that the fingerprint inquiry template is better quality than one or more of the fingerprint enrollment templates,
   discard the fingerprint enrollment template with the worst quality, and
   replace the discarded fingerprint enrollment template with the fingerprint inquiry template, thereby making the fingerprint inquiry template one of the fingerprint enrollment templates.

16. The system of claim 11, wherein the quality value associated with each of the fingerprint enrollment templates is based on the image contrast of the fingerprint enrollment template associated with that quality value.

17. The system of claim 11, wherein the quality value associated with each fingerprint enrollment template is based on the signal-to-noise ratio for the fingerprint enrollment template associated with that quality value.

18. The system of claim 11, wherein the quality value associated with each fingerprint enrollment template is additionally based on how much the fingerprint inquiry template overlaps with the fingerprint enrollment template associated with that quality value.

19. The system of claim 11, wherein the memory further stores instructions for causing the at least one processor to allow the individual to access an application on a mobile device based on the authentication.

20. The system of claim 11, wherein the memory further stores instructions for causing the at least one processor to allow the individual to use a computer based on the authentication.

21. A system for authenticating an individual, comprising:
   means for obtaining a first fingerprint enrollment template and a second fingerprint enrollment template, wherein the first and second fingerprint enrollment templates are both associated with the individual, the first fingerprint enrollment template was produced by scanning a portion of a friction-ridge surface of an enrollment finger of the individual, and the second fingerprint enrollment template was produced by scanning another portion of the friction-ridge surface of the enrollment finger of the individual;
   means for obtaining a fingerprint inquiry template produced by scanning a portion of a friction-ridge surface of a finger;
   means for producing a first match score by comparing the fingerprint inquiry template to the first fingerprint enrollment template and for producing a second match score by comparing the fingerprint inquiry template to the second fingerprint enrollment template;
   means for adding a plurality of match scores together to produce a composite match score sum, wherein:
      the first match score and the second match score are match scores in the plurality of match scores,
      each match score is produced by comparing the fingerprint inquiry template against a different fingerprint enrollment template of a plurality of fingerprint enrollment templates associated with the individual,
      the first fingerprint enrollment template and the second fingerprint enrollment template are included in the plurality of fingerprint enrollment templates, and
      at least one of the match scores in the plurality of match scores is multiplied by a weighting factor prior to being added to the other match scores in the plurality of match scores to produce the composite match score sum; and
   means for authenticating the individual by comparing the composite match score sum to an acceptance range, wherein:
      each weighting factor is based on a quality value associated with the fingerprint enrollment template for which the match score that is to be multiplied by that weighting factor was produced, and
      the quality value is based on one or more items selected from the group consisting of: image contrast of the fingerprint enrollment template associated with the quality value and a signal-to-noise ratio of the fingerprint enrollment template associated with the quality value.

22. The system of claim 21, wherein the means for obtaining the fingerprint inquiry template is an area-array sensor.

23. The system of claim 21, wherein the means for obtaining the fingerprint inquiry template is an ultrasonic sensor.

24. The system of claim 21, wherein each of the match scores in the plurality of match scores is multiplied by a corresponding weighting factor prior to being added to the other match scores in the plurality of match scores to produce the composite match score sum.

25. The system of claim 21, further comprising means for:
   determining that the fingerprint inquiry template is better quality than one or more of the fingerprint enrollment templates,
   discarding the fingerprint enrollment template with the worst quality, and
   replacing the discarded fingerprint enrollment template with the fingerprint inquiry template, thereby making the fingerprint inquiry template one of the fingerprint enrollment templates.

26. A non-transitory computer-readable storage medium having stored thereon instructions for causing a computer to:
   obtain a first fingerprint enrollment template associated with an individual, wherein the first fingerprint enrollment template was produced by scanning a portion of a friction-ridge surface of an enrollment finger of the individual;
   obtain a second fingerprint enrollment template associated with the individual, wherein the second fingerprint enrollment template was produced by scanning another portion of the friction-ridge surface of the enrollment finger of the individual;
   obtain a fingerprint inquiry template, wherein the fingerprint inquiry template was produced by scanning a portion of a friction-ridge surface of a finger;
   produce a first match score by comparing the fingerprint inquiry template to the first fingerprint enrollment template;
   produce a second match score by comparing the fingerprint inquiry template to the second fingerprint enrollment template;
   add a plurality of match scores together to produce a composite match score sum, wherein:

the first match score and the second match score are match scores in the plurality of match scores, each match score is produced by comparing the fingerprint inquiry template against a different fingerprint enrollment template of a plurality of fingerprint enrollment templates associated with the individual, the first fingerprint enrollment template and the second fingerprint enrollment template are included in the plurality of fingerprint enrollment templates, and at least one of the match scores in the plurality of match scores is multiplied by a weighting factor prior to being added to the other match scores in the plurality of match scores to produce the composite match score sum; and authenticate the individual by comparing the composite match score sum to an acceptance range, wherein:

each weighting factor is based on a quality value associated with the fingerprint enrollment template for which the match score that is to be multiplied by that weighting factor was produced, and the quality value is based on one or more items selected from the group consisting of: image contrast of the fingerprint enrollment template associated with the quality value and a signal-to-noise ratio of the fingerprint enrollment template associated with the quality value.

27. The non-transitory computer-readable storage medium of claim 26, wherein the instructions further cause the computer to instruct an area-array sensor to scan a portion of a friction-ridge surface of an inquiry finger in order to obtain the fingerprint inquiry template.

28. The non-transitory computer-readable storage medium of claim 26, wherein the instructions further cause the computer to instruct an ultrasonic sensor to scan a portion of a friction-ridge surface of an inquiry finger in order to obtain the fingerprint inquiry template.

29. The non-transitory computer-readable storage medium of claim 26, wherein each of the match scores in the plurality of match scores is multiplied by a corresponding weighting factor prior to being added to the other match scores in the plurality of match scores to produce the composite match score sum.

30. The non-transitory computer-readable storage medium of claim 26, wherein the instructions further cause the computer to:

determine that the fingerprint inquiry template is better quality than one or more of the fingerprint enrollment templates, discard the fingerprint enrollment template with the worst quality, and replace the discarded fingerprint enrollment template with the fingerprint inquiry template, thereby making the fingerprint inquiry template one of the fingerprint enrollment templates.

* * * * *